United States Patent
Clauss et al.

(10) Patent No.: US 9,646,346 B2
(45) Date of Patent: May 9, 2017

(54) METHODS, DEVICES AND SYSTEMS FOR AUTOMATICALLY TRIGGERING DATA COLLECTION EVENTS AND COLLECTING INSURANCE RATING DATA

(71) Applicant: STATE FARM MUTUAL AUTOMOBILE INSURANCE COMPANY, Bloomington, IL (US)

(72) Inventors: Mark E. Clauss, Bloomington, IL (US); Richard J. Lovings, Bloomington, IL (US); David W. Thurber, Sherman, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 14/156,958

(22) Filed: Jan. 16, 2014

(65) Prior Publication Data
US 2015/0039349 A1     Feb. 5, 2015

Related U.S. Application Data

(63) Continuation of application No. 13/958,131, filed on Aug. 2, 2013, now Pat. No. 8,666,789.

(51) Int. Cl.
*H04B 1/02* (2006.01)
*G06Q 40/08* (2012.01)
*H04M 1/725* (2006.01)
*H04W 4/00* (2009.01)
*H04W 8/08* (2009.01)

(52) U.S. Cl.
CPC ........ *G06Q 40/08* (2013.01); *H04M 1/72519* (2013.01); *H04W 4/008* (2013.01); *H04W 8/08* (2013.01)

(58) Field of Classification Search
USPC ................................................. 455/95; 705/4
See application file for complete search history.

(56) References Cited

U.S. PATENT DOCUMENTS

2013/0302758 A1* 11/2013 Wright ............................ 434/65
2013/0316737 A1* 11/2013 Guba et al. ................ 455/456.4

* cited by examiner

*Primary Examiner* — Edward Chang
(74) *Attorney, Agent, or Firm* — Marshall, Gerstein & Borun LLP; Randall G. Rueth (57) ABSTRACT

The devices, methods, systems and computer-readable mediums of the present disclosure provide automatic data collection for insurance rating purposes. In particular, a battery powered Bluetooth device may be attached to a personal item of an insured individual. The Bluetooth device may automatically trigger a mobile telephone to begin storing data related to use of the personal item when the mobile telephone is proximate the Bluetooth device. The mobile telephone may periodically transmit the stored data to a remote server.

20 Claims, 9 Drawing Sheets

METHODS, DEVICES AND SYSTEMS FOR AUTOMATICALLY TRIGGERING DATA COLLECTION EVENTS AND COLLECTING INSURANCE RATING DATA

RELATED APPLICATION

This application is a continuation of U.S. patent application Ser. No. 13/958,131, filed on Aug. 2, 2013, and entitled Bluetooth Devices for Triggering Data Collection Events and Methods and Systems for Collecting Insurance Rating Data. The entire disclosure of which is incorporated herein by reference.

TECHNICAL FIELD

The present disclosure generally relates to systems and methods for collecting data that may be used for determining insurance ratings. More particularly, the present disclosure relates to a battery powered Bluetooth device that automatically triggers a mobile computing device to store data, such as a series of locations and a time stamp associated with each location, when the mobile computing device is proximate the Bluetooth device.

BACKGROUND

Mobile computing devices, such as "smart phones," are becoming common place. Most mobile telephones include a short range wireless transceiver (e.g., a Bluetooth transceiver) in addition to a local area network transceiver (e.g., a WiFi transceiver) and a cellular telephone network transceiver. Many mobile telephones now include a global positioning device, a calendar, a clock and other situational sensors. Additionally, a typical mobile telephone includes a memory for storing data and various applications that, when executed by a processor within the mobile telephone, enable various functionality, such as receiving, storing and transmitting data.

Bluetooth devices are becoming equally common place. Bluetooth devices for use with mobile telephones are available. For example, headsets, microphones, speakers, etc. are often wirelessly connected to a mobile telephone via a Bluetooth interface.

Owners of mobile telephones rarely travel far without their phone. For example, people frequently have their mobile telephones with them when driving cars, boats, jet skis, motorcycles, ATVs and the like. Mobile telephones are often considered a necessity when traveling in airplanes, trains, buses, etc. Furthermore, mobile telephones are regularly carried when individuals walk, run, ride bicycles, ski and perform other physical activities.

SUMMARY

A computerized method for automatically collecting and storing insurance rating related data may include receiving, at a processor of a mobile computing device, an indication that the mobile computing device is proximate a wireless transceiver device. The method may also include receiving, at the processor of the mobile computing device, data representative of an identification of the wireless transceiver device. The method may further include causing the processor to automatically store insurance rating related data that is correlated with the data representative of the identification of the wireless transceiver device in a memory in response to receiving the indication that the wireless transceiver device is proximate the mobile computing device.

In another embodiment, a system for automatically collecting and storing insurance rating related data may include a wireless transceiver device for providing an indication that a mobile computing device insurance application is proximate the wireless transceiver device and for providing data representative of an identification of the wireless transceiver device. The system may further include a wireless transceiver device and mobile computing device synchronization module stored on a computer-readable medium that, when executed by a processor, receives the indication that the wireless transceiver is proximate the mobile computing device insurance application and provides an indication that the wireless transceiver device is proximate the mobile computing device insurance application. The system may also include an insurance rating related data logging module stored on a computer-readable medium that, when executed by a processor, automatically stores insurance rating related data on a memory in response to receiving the indication that the wireless transceiver device is proximate the mobile computing device insurance application.

In yet another embodiment, a computer-readable storage medium comprising non-transitory computer-readable instructions stored thereon, to be executed on a processor of a system for automatically collecting and storing insurance rating related data, may include a wireless transceiver device and mobile computing device synchronization module that, when executed by a processor, receives an indication that a wireless transceiver is proximate a mobile computing device and that provides an indication that the wireless transceiver device is proximate the mobile computing device. The instructions may further include an insurance data logging module that, when executed by a processor, automatically stores insurance rating related data on a memory in response to receiving the indication that the wireless transceiver device is proximate the mobile computing device.

BRIEF DESCRIPTION OF THE DRAWINGS

The figures described below depict various aspects of the systems and methods disclosed herein. It should be understood that each figure depicts an embodiment of a particular aspect of the disclosed systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Insurance rates are often based on various personal characteristics. For example, the cost of automobile insurance may, at least in part, be based on the distance an individual drives to work, where the individual lives, where the individual drives, etc. Generally, this information is provided to the insurance company by an insurance purchaser at the time an insurance policy is underwritten. Insurance companies count on the insurance purchaser to provide new information when changes occur.

With recent advancements in technology, such as mobile telephone technology, more people are acquiring the means to automate various aspects of sharing personal information. The devices, methods and systems of the present disclosure provide automatic collection of various data that may be used for insurance rating purposes. In particular, a Bluetooth device may be attached to a personal item (e.g., an automobile) belonging to an insured person and an application may be installed on the insured person's mobile telephone. Each Bluetooth device may be identified with a particular media access control (MAC) address and the MAC address may be associated with a particular personal item.

When the mobile telephone is proximate the Bluetooth device, indicative of, for example, that the insured person is driving her automobile, the mobile telephone may automatically begin to store data that may be used for insurance rating purposes. For example, when the mobile telephone includes a global positioning device, a calendar and a clock, the mobile telephone may periodically store a location of the mobile telephone along with a day and a time stamp associated with each location. The mobile telephone and the Bluetooth device may be configured such that no action is required on the part of a user, aside from bringing the mobile telephone proximate the Bluetooth device, in order for the mobile telephone to automatically store data. Similarly, no interaction is required on behave of the user in respect to the personal item (e.g., no ignition activation is required).

The mobile telephone may periodically transmit the stored insurance rating related data to a remote server. For example, the mobile telephone may detect the presence of a wireless fidelity (WiFi) access point. In response to detecting the presence of a WiFi access point, the mobile telephone may transmit the stored insurance rating related data to the remote server. Alternatively, the mobile telephone may transmit the insurance rating related data to a remote server via a cellular telephone network.

Figure 1A:
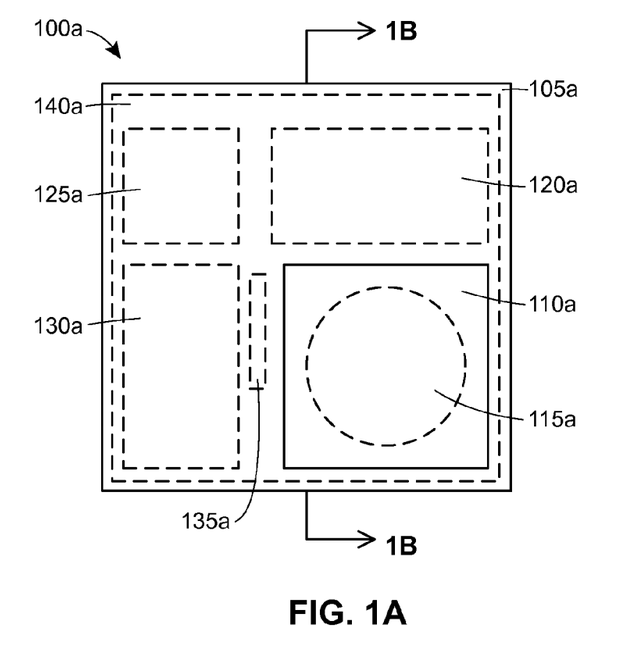
FIGS. 1A-1C depict various views of an example wireless transceiver device capable of triggering a mobile device to log data.
Figure 1B:
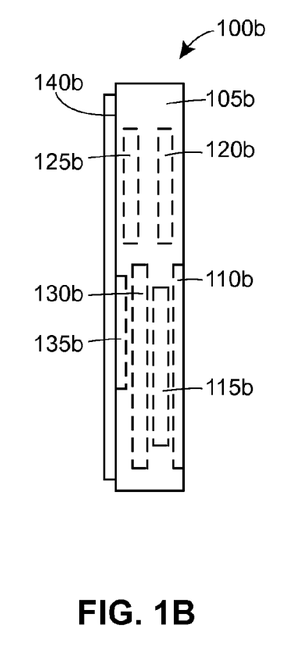
Figure 1C:
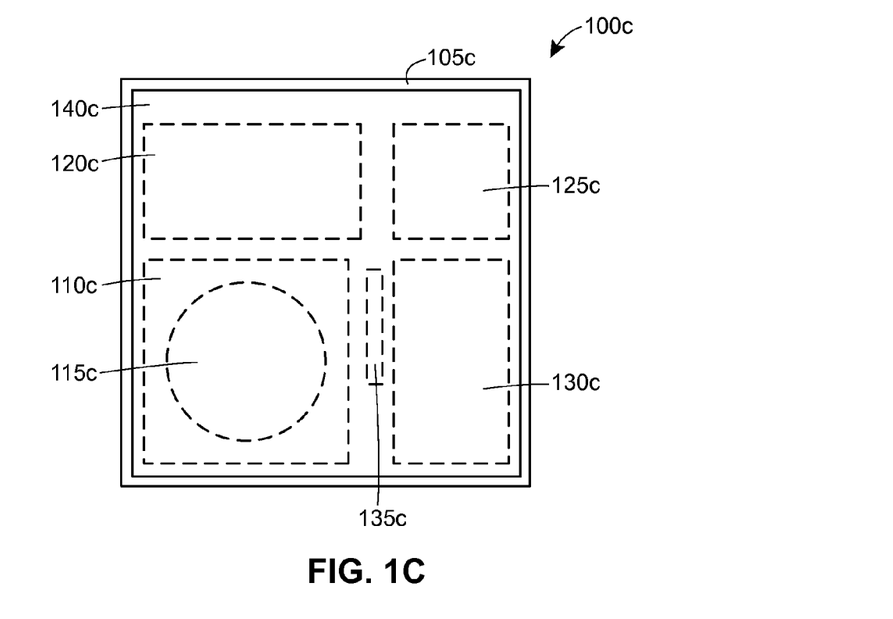

Turning to FIGS. 1A-1C, an example Bluetooth device 100a, 100b, 100c is depicted. The Bluetooth device 100a, 100b, 100c may include a replaceable battery 115a, 115b, 115c which may be retained within the Bluetooth device 100a, 100b, 100c, at least in part, by the battery access cover 110a, 110b, 110c. The Bluetooth device 100a, 100b, 100c may further include a memory 120a, 120b, 120c, a processor 125a, 125b, 125c and a transceiver 130a, 130b, 130c.

As depicted in FIG. 1A, the Bluetooth device 100a may include a top side 105a. FIG. 1B represents a side 105b view of a cross section 1B-1B of the Bluetooth device 100a. As can be seen in FIG. 1B, the Bluetooth device 100b may include a double-sided adhesive 140b that may facilitate attachment of the Bluetooth device 100b to a personal item (e.g., a vehicle, motorcycle, boat, bicycle, etc.) belonging to an insured person. With additional reference to FIG. 1C, the Bluetooth device 100c may include a tamperproof mechanism 135c that may be incorporated between a bottom side 105c of the Bluetooth device 100c and the double-sided adhesive 140c. The double-sided adhesive 140c and the tamperproof device 135c may be configured such that, once the Bluetooth device 100c is attached to a personal item belonging to an insured person, removal of the Bluetooth device 100c will cause the double-sided adhesive 140c to break the tamperproof mechanism 135c. As a result, the double-sided adhesive 140c in combination with the tamperproof mechanism 135c prevents tampering with the Bluetooth device 100c.

The memory 120a, 120b, 120c may include data representative of a Bluetooth device media access control (MAC) address along with computer-readable instructions that, when executed by the processor 125a, 125b, 125c cause the Bluetooth device 100a, 100b, 100c to measure a remaining charge of the replaceable battery 115a, 115b, 115c and transmit the data representative of the MAC address and data representative of the remaining charge to a mobile telephone (e.g., mobile telephone 305 of FIG. 3) when the mobile telephone 305 is proximate the Bluetooth device 100a, 100b, 100c. As described elsewhere herein, transmission of the data representative of the MAC address may cause the mobile telephone 305 to begin logging data.

It should be understood that other wireless communications protocols, aside from the Bluetooth communications protocol, may be used. For example, the device 100a, 100b, 100c may employ other radio frequency identification (RFID) technologies.

Figure 2A:
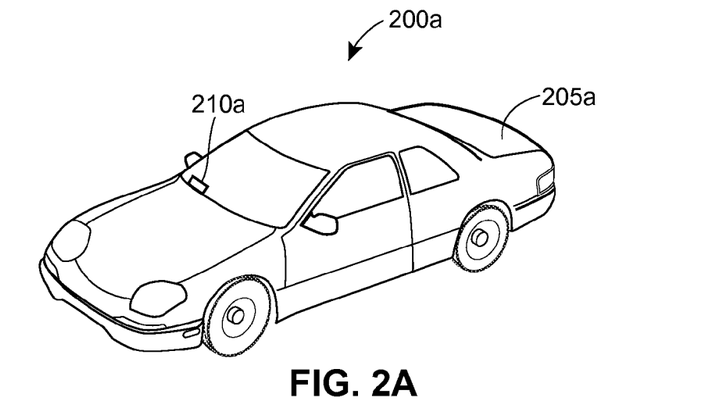
FIGS. 2A-2H and 2J illustrate various personal use items including a wireless transceiver device of FIGS. 1A-1C.
Figure 2B:
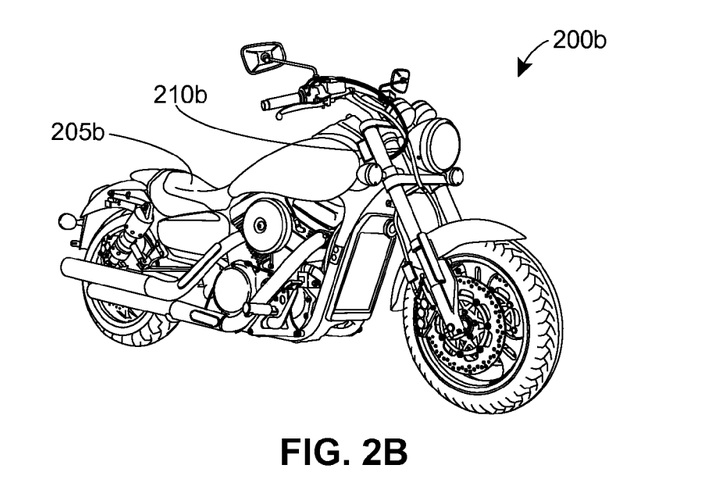
Figure 2C:
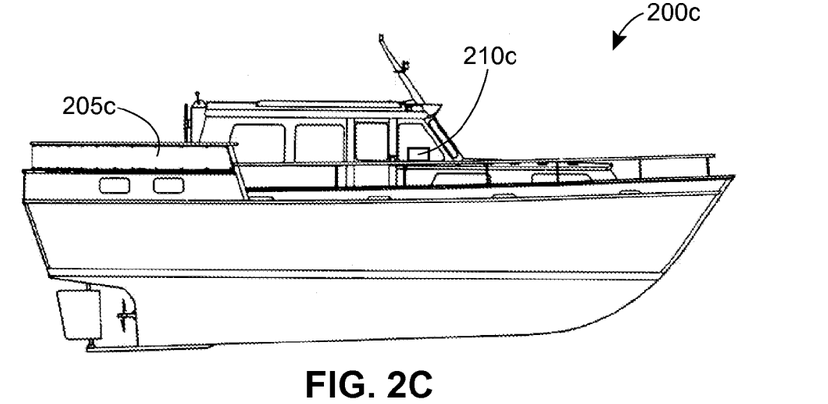
Figure 2D:
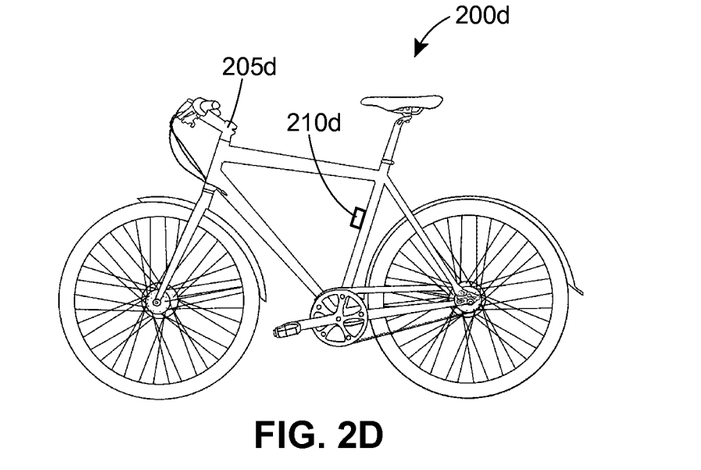
Figure 2E:
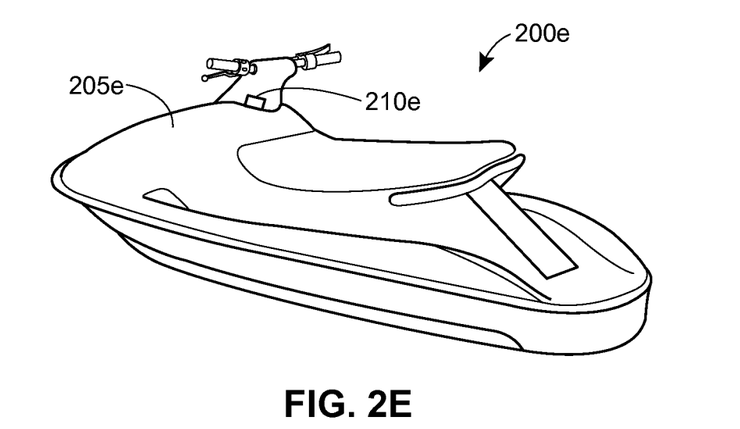
Figure 2F:
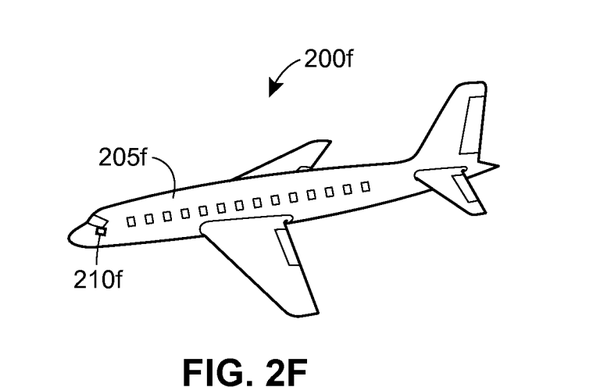
Figure 2G:
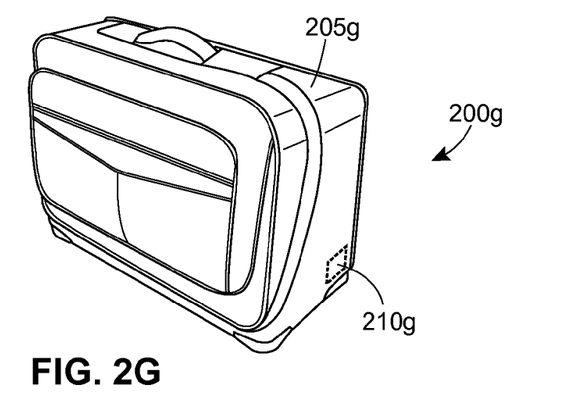
Figure 2H:
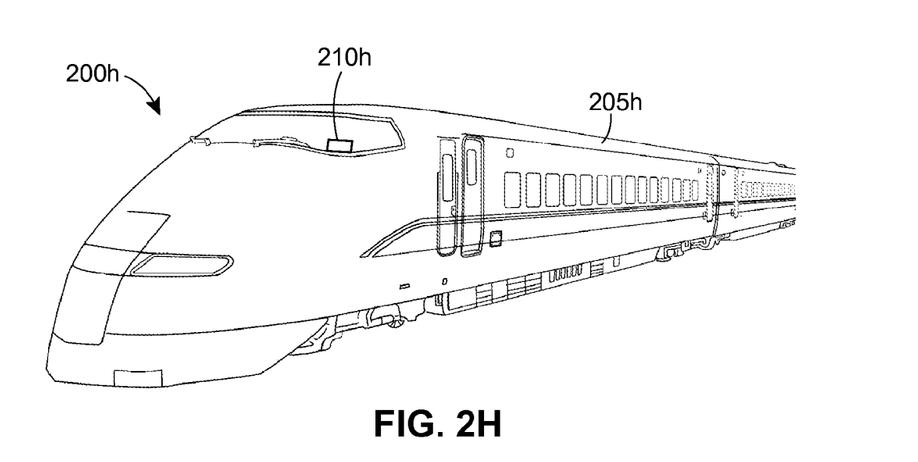
Figure 2J:
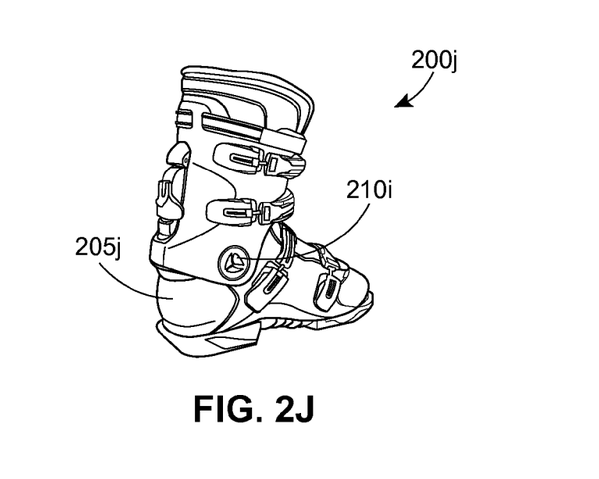

With reference now to FIGS. 2A-2H and 2J, a Bluetooth device (similar to Bluetooth device 100a, 100b, 100c) may be attached to various personal items 200a-200h and 200j. For example, as depicted in FIG. 2A, a Bluetooth device 210a may be attached to an insured person's car 205a. As depicted in FIG. 2B, a Bluetooth device 210b may be attached to an insured person's motorcycle 205b. As depicted in FIG. 2C, a Bluetooth device 210c may be attached to an insured person's boat 205c. As depicted in FIG. 2C, a Bluetooth device 210d may be attached to an insured person's bicycle 205d. As depicted in FIG. 2E, a Bluetooth device 210e may be attached to an insured person's jet ski 205e. Alternatively, as depicted in FIGS. 2F and 2H, a Bluetooth device 210f may be attached to an airplane 205f in which an insured person is traveling or a Bluetooth device 210h may be attached to a train 205h in which an insured person is traveling. As depicted in FIG. 2G, a Bluetooth device 210g may be attached to an insured person's luggage 205g. While FIG. 2G depicts the Bluetooth device 210g as being attached to an insured person's luggage 205g, it should be understood that the Bluetooth device 210g may be attached to a briefcase, a book bag, a backpack, a tennis racket bag, a golf club bag, etc. As depicted in FIG. 2J, a Bluetooth device 210j may be attached to an insured person's ski boot 205j. While FIG. 2J depicts the Bluetooth device 210j as being attached to an insured person's ski boot 205j, it should be understood that the Bluetooth device 210j may be attached to a running shoe, a tennis shoe, a golf shoe, a hiking boot, a work boot, a snowboard boot, sports apparel, a coat, etc. It should be understood that a Bluetooth device 100a may be attached to any personal item 205a or attached to a lanyard and worn around the insured person's neck. As described elsewhere herein, any given Bluetooth device 100a may be associated with an insured person's mobile telephone 305 such that the mobile telephone 305 will automatically log data associated with a particular activity that is related to the particular personal item 205a-205h and 205j. For example, data may be logged that is representative of how far, when and where an insured person went driving, riding, boating, biking, jet skiing, flying, traveling, skiing, etc. As further described herein, data representative of how fast the insured person was moving may be determined based on the logged position and time data.

Figure 3:
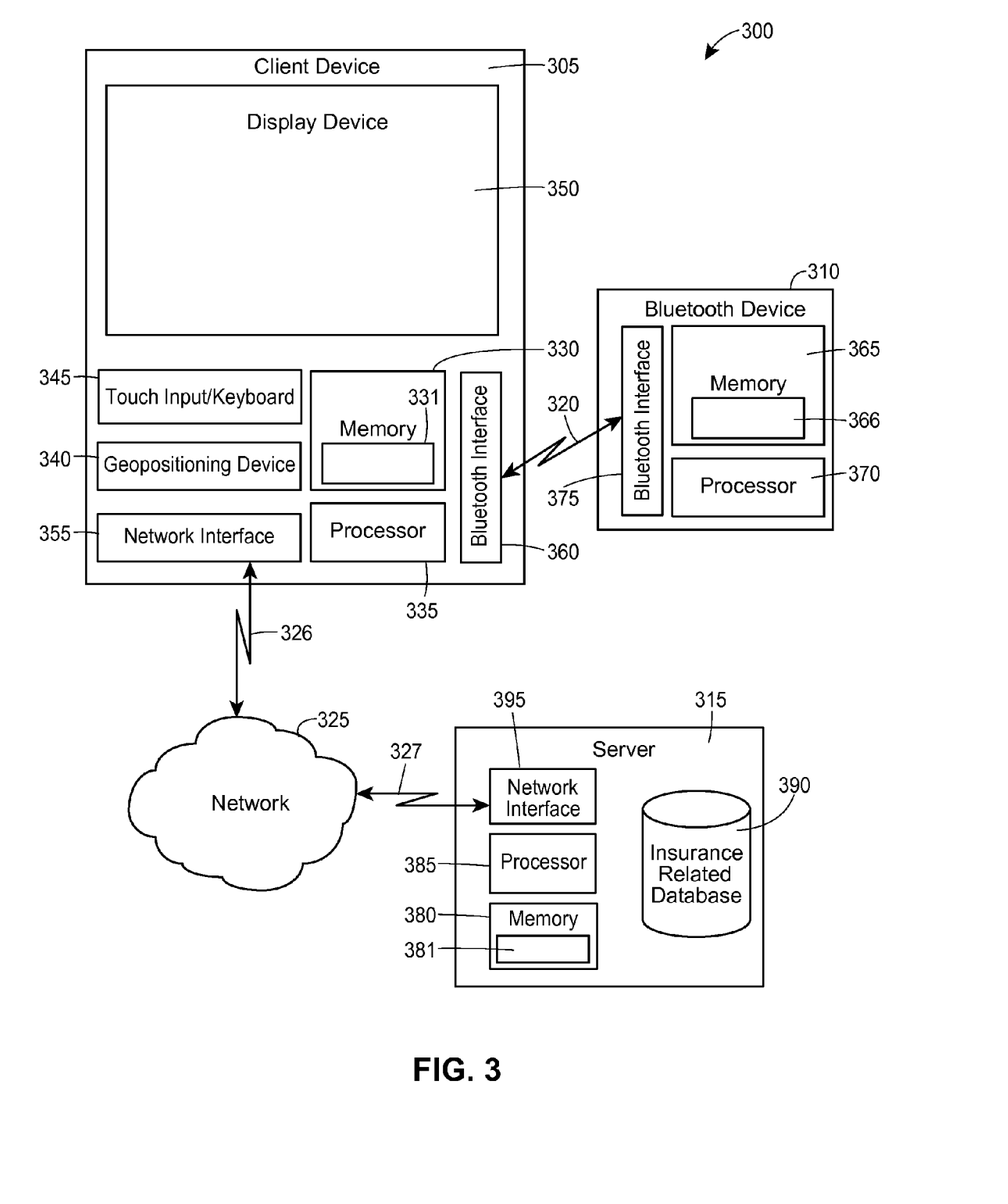
FIG. 3 depicts a high-level block diagram of an example system for logging insurance ranking data including a wireless transceiver device, a mobile device and a remote server.

The details associated with a computer system 300 for logging data for use in determining insurance ratings are now described beginning with reference to FIG. 3. FIG. 3 depicts a high-level block diagram of a computer system 300 that implements communications between a client device 305 (e.g., a mobile telephone), a Bluetooth device 310 and a remote computing device 315 to provide data to an insurance related database 390. The client device 305 may be communicatively coupled to the Bluetooth device 310 via the Bluetooth wireless link 320 and to the remote computing device 315 via a network 325.

For clarity, only one client device 305 is depicted in FIG. 3. While FIG. 3 depicts only one client device 305, it should be understood that any number of client devices 305 may be supported and that each client device 305 may be any appropriate computing device, such as a mobile telephone, a personal data assistant, a tablet or a lap-top computer. The client device 305 may include a memory 330 and a processor 335 for storing and executing, respectively, a module 331. The module 331, stored in the memory 330 as a set of computer-readable instructions, may be related to an insurance rating related data logging application that, when executed on a processor 335, causes insurance rating related data to be stored in the memory 330. As described in detail herein, the module 331 may facilitate interaction between the client device 305, the Bluetooth device 310 and the remote computing device 315.

The processor 335, further executing the module 331, may facilitate communications between the computing device 315 and the client device 305 via a network interface 355, a client device network connection 326 and the network 325. The client device 305 may include a display device 350 which may be any type of electronic display device such as a liquid crystal display (LCD), a light emitting diode (LED) display, a plasma display, a cathode ray tube (CRT) display, or any other type of known or suitable electronic display. The display device 350 may exhibit a display which depicts a user interface for configuring the client device 305 to communicate with the Bluetooth device 310 via the client device Bluetooth interface 360, the Bluetooth wireless link 320 and the Bluetooth device Bluetooth interface 375. The client device 305 may include a user input device 345, such as a touch input/keyboard/pointing device (e.g., a mouse) that provides a mechanism for a user of the client device 305 to launch a data logging application, to enter related information and to manually enter insurance rating related data, such as an odometer reading of a vehicle. The user input device 345 may be configured as an integral part of a display device 350, such as a touch screen display device. The network interface 355 may be configured to facilitate communications between the client device 305 and the remote computing device 315 via any hardwired or wireless communication network 325, including for example a hardwired Ethernet connection or a wireless LAN, MAN or WAN, WiFi, the Internet, or any combination thereof. Moreover, the client device 305 may be communicatively connected to the remote computing device 315 via any suitable communication system, such as via any publicly available or privately owned communication network, including those that use wireless communication structures, such as wireless communication networks, including for example, wireless LANs and WANs, satellite and cellular telephone communication systems, etc.

The Bluetooth device 310 may include a memory 365 storing a module 366 that, when executed by a processor 370, may transmit a Bluetooth device 310 MAC address to a client device 305. As described elsewhere herein, transmission of the Bluetooth device 310 MAC address to the client device 305 may cause the client device 305 to begin storing insurance rating related data in the memory 330. Alternatively, the client device 305 may cause insurance related data to be stored in a remote server 315 memory 380 and/or a remote insurance related database 390.

The computing device 315 may include a memory 380 and a processor 385 for storing and executing, respectively, a module 381. The module 381, stored in the memory 380 as a set of computer-readable instructions, facilitates applications related to logging insurance rating related data. The module 381 may also facilitate communications between the computing device 315 and the client device 305 via a network interface 395, a remote computing device network connection 327 and the network 325 and other functions and instructions.

The computing device 315 may be communicatively coupled to an insurance related database 390. While the insurance related database 390 is shown in FIG. 3 as being communicatively coupled to the remote computing device 315, it should be understood that the insurance related database 390 may be located within separate remote servers (or any other suitable computing devices) communicatively coupled to the remote computing device 315. Optionally, portions of insurance related database 390 may be associated with memory modules that are separate from one another, such as a memory 330 of the client device 305.

Figure 4:
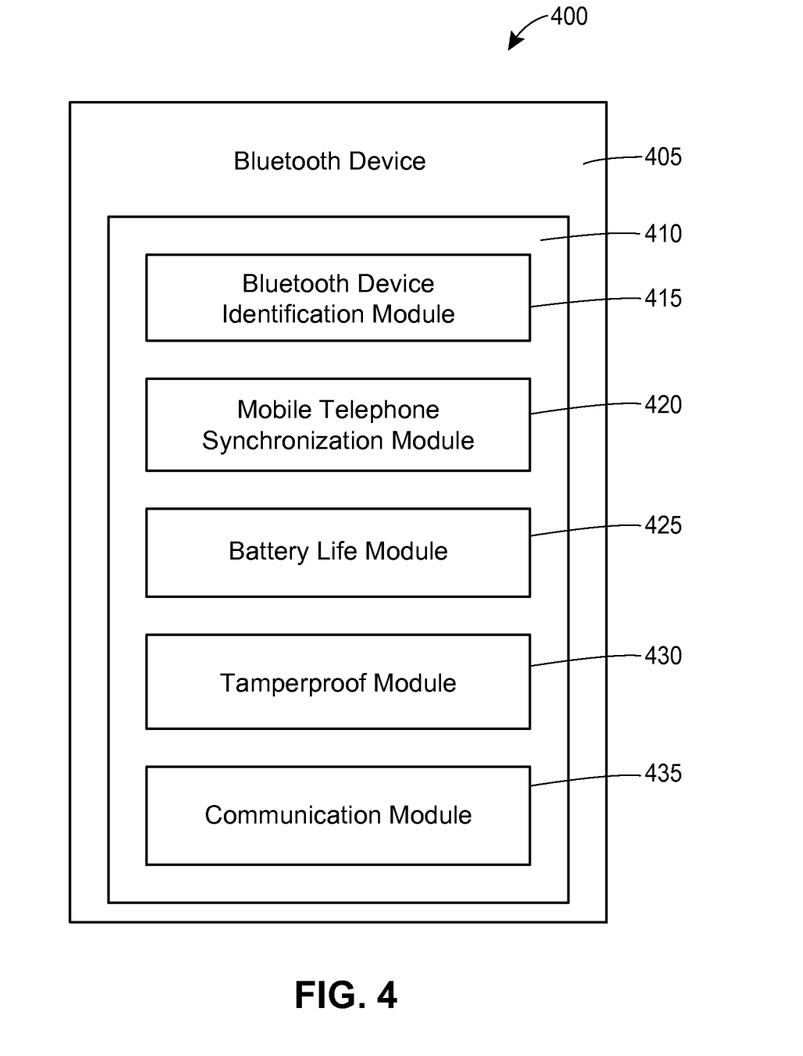
FIG. 4 depicts a block diagram of an example wireless transceiver device.

Turning to FIG. 4, a block diagram 400 of an example Bluetooth device 405 is depicted. The Bluetooth device 405 may be similar to the Bluetooth devices 100a, 100b, 100c of FIGS. 1A-1C, respectively, or Bluetooth device 310 of FIG. 3. In any event, the Bluetooth device 405 may include modules 415-435 stored in a memory 410 that, when executed on a processor (e.g., processor 370 of FIG. 3), may cause a mobile device (e.g., mobile device 305 of FIG. 3) to log insurance rating related data. The modules 415-435 may be included within the module 366 of FIG. 3, for example. In particular, the Bluetooth device 405 may include a Bluetooth device identification module 415, a mobile telephone synchronization module 420, a battery life module 425, a tamperproof module 430 and a communications module 435.

Figure 5:
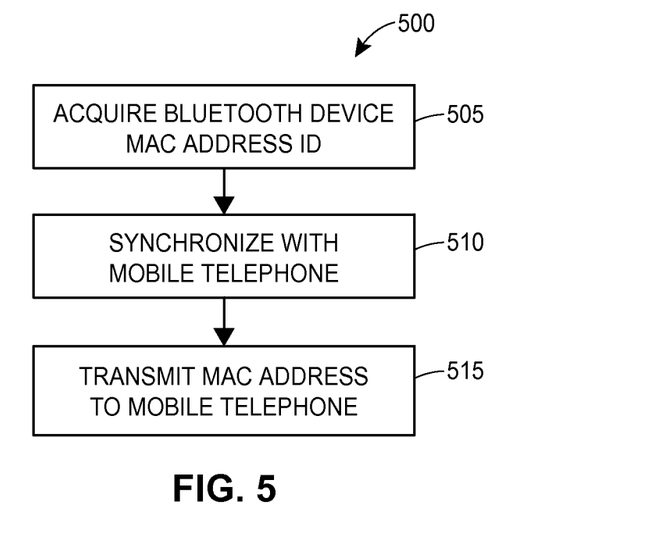
FIG. 5 depict a flow diagram of an example method of associating a Bluetooth device with a mobile telephone.

With additional reference to FIG. 5, a flow diagram is depicted for an example method 500 of associating a Bluetooth device with a mobile telephone. The processor 370, executing the Bluetooth device identification module 415, may cause the Bluetooth device 310 to acquire a Bluetooth device media access control (MAC) address identification (block 505). The processor 370, executing the mobile telephone synchronization module 420, may cause the Bluetooth device 310 to synchronize with the mobile telephone 305 (block 510). The processor 370, executing the communications module 435, may cause the Bluetooth device 310 to transmit the Bluetooth device MAC address identification to the mobile telephone 305 (block 515). As described elsewhere herein, once the mobile telephone 305 receives the Bluetooth device MAC address identification, the mobile telephone 305 may establish a data file on the memory 330 for logging insurance rating related data corresponding to a personal item (e.g., personal item 210a-210h and 210j of FIG. 2) and associated with the given Bluetooth device MAC address identification. The method 500 may be coordinated with the method 800 of FIG. 8 to provide an association between a Bluetooth device 310 and a mobile telephone 305.

Figure 6:
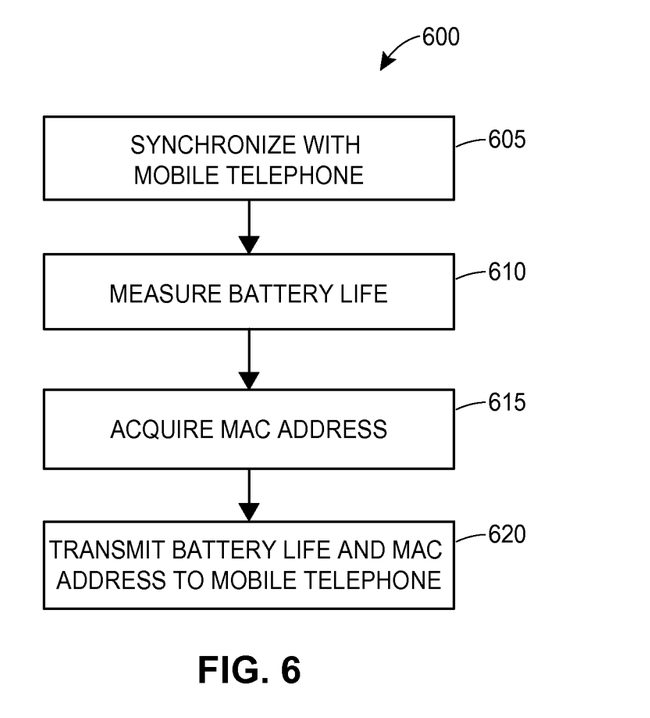
FIG. 6 depicts a flow diagram of an example method of synchronizing a Bluetooth device with a mobile telephone.

With reference to FIG. 6, a flow diagram of an example method 600 for synchronizing a Bluetooth device 310 with a mobile telephone 305 is depicted. The processor 370, executing the mobile telephone synchronization module 420, may cause the Bluetooth device 310 to synchronize with the mobile telephone 305 (block 605). The processor 370, executing the battery life module 425, may measure a charge remaining in the battery (e.g., battery 115a of FIG. 1) (block 610). The processor 370, executing the Bluetooth device identification module 415, may cause the Bluetooth device 310 to acquire a Bluetooth device media access control (MAC) address identification (block 615). The processor 370, executing the communication module 435, may cause the Bluetooth device 310 to transmit data, representative of the remaining charge in the battery 115a and data representative of the Bluetooth device MAC address identification, to the mobile telephone 305 (block 620). The mobile telephone 305 may log insurance rating data in response to receiving the Bluetooth device MAC address identification data. The method 600 may be coordinated with the method 900 of FIG. 9 to synchronize a Bluetooth device 310 and a mobile telephone 305 and to automatically store insurance rating related data.

Figure 7:
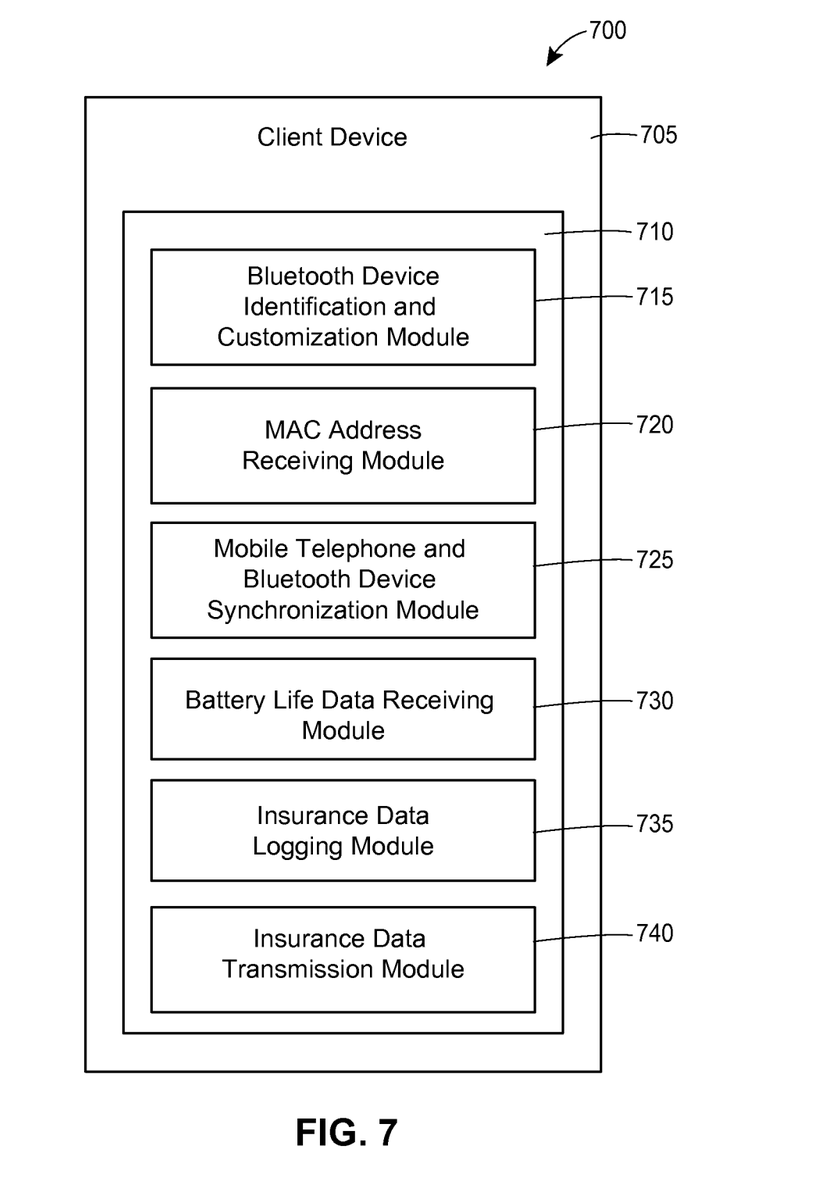
FIG. 7 depicts a block diagram of an example mobile telephone with an application for logging data.

Turning to FIG. 7, a block diagram 700 of an example client device 705 is depicted to include modules 715-740, stored on a memory 710, that, when executed on a processor (e.g., processor 335 of FIG. 3), may cause the client device 705 to log insurance rating related data. The client device 705 may be similar to the mobile telephone 305 of FIG. 3. The modules 715-740 may be included within module 331 of FIG. 3. In any event, the client device 705 may include a Bluetooth device identification and customization module 715, a MAC address receiving module 720, a mobile telephone and Bluetooth device synchronization module 725, a battery life data receiving module 730, an insurance data logging module 735 and insurance data transmission module 740.

Figure 8:
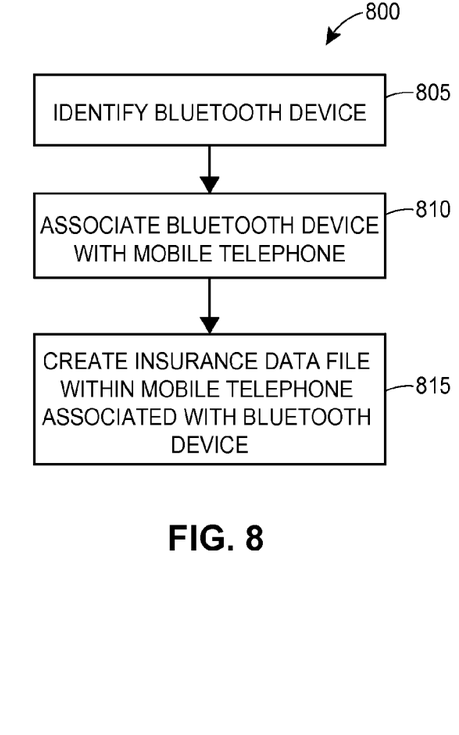
FIG. 8 depicts a flow diagram of an example method of associating a mobile telephone with Bluetooth device.

With additional reference to FIG. 8, a flow diagram of an example method 800 of associating a mobile telephone 305 with Bluetooth device 310 is illustrated. A processor (e.g., processor 335 of FIG. 3), executing the Bluetooth device identification and customization module 715, may, in response to a user of a mobile telephone 305 initiating an insurance application, identify a Bluetooth device 310 (block 805). For example, a user may bring a mobile telephone 305, that is to be associated with a given Bluetooth device 310, within proximity of the Bluetooth 310, that is to be associated with the given mobile telephone 305, and the processor 335 may automatically associate the mobile telephone 305 with the Bluetooth device 310 (block 810). Alternatively, a user of a mobile telephone 305 may, via a user interface of an insurance application, enter information that the processor 335 uses to associate the mobile telephone 305 with the Bluetooth device 310 (block 810). The processor 335, further executing the Bluetooth device identification and customization module 715, may create an insurance data file within the mobile telephone 305 associated with the Bluetooth device 310 (block 815). The method 800 may be coordinated with the method 500 of FIG. 5 to provide an association between a Bluetooth device 310 and a mobile telephone 305.

Figure 9:
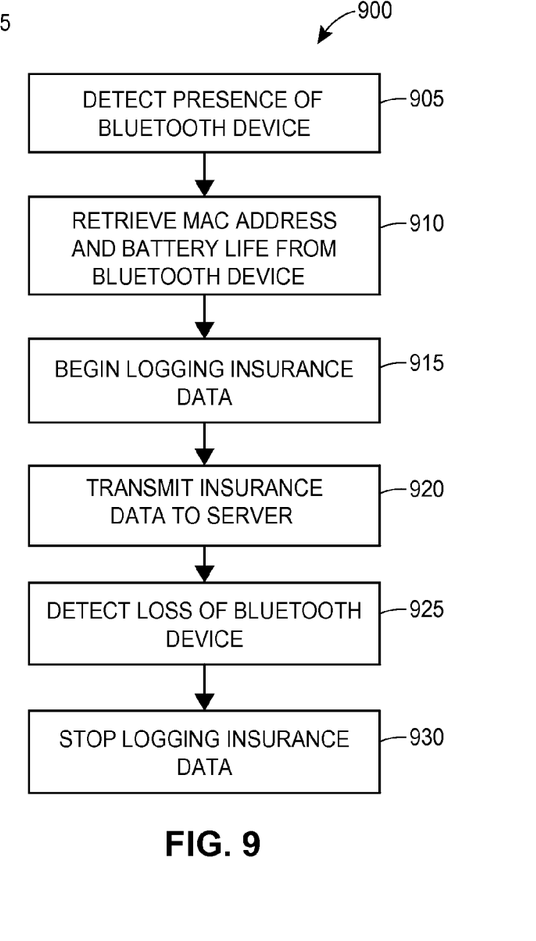
FIG. 9 depicts a flow diagram of an example method of automatically triggering a mobile telephone to log data.

With additional reference to FIG. 9, a flow diagram of an example method 900 of automatically triggering a mobile telephone 305 to log insurance rating related data is illustrated. A processor (e.g., processor 335 of FIG. 3), executing the mobile telephone and Bluetooth device synchronization module 725, may detect the presence of a Bluetooth device 310 in proximity to a mobile telephone 305 (block 905). When the processor 335 detects the presence of a Bluetooth device 310 in proximity of the mobile telephone 305, the processor 335, executing the MAC address receiving module 720 and the batter life data receiving module 730, may retrieve data representative of a MAC address and data representative of battery life (e.g., data representative of a remaining charge in a battery 115a) from the Bluetooth device 310 (block 910). For example, when an insured person brings her mobile telephone 305 in close proximity to a Bluetooth device 310, the processor 335 may automatically retrieve data representative of a MAC address and data representative of battery life from the Bluetooth device 310. The processor 335, executing the insurance data logging module 735, may store data representative of insurance rating related information in a memory (e.g., memory 330 of FIG. 3) (block 915). For example, when an insured person brings his mobile telephone 305 in close proximity to a Bluetooth device 310, the processor 335 may automatically cause the mobile telephone to begin storing insurance rating related data in the memory 330. The processor 335, executing the insurance data transmission module 740, may transmit data representative of insurance rating related information to a remote server (e.g., remote server 315 of FIG. 3) (block 920). The processor 335, further executing the mobile telephone and Bluetooth device synchronization module 725, may detect that the Bluetooth device 310 is no longer proximate the mobile telephone 305 (block 925). In response to detecting that the Bluetooth device 310 is no longer proximate the mobile telephone 305 (block 925), the processor 335 may automatically cause the mobile telephone 305 to discontinue storing insurance rating related data (block 930). The method 900 may be coordinated with the method 600 of FIG. 6 to synchronize a Bluetooth device 310 and a mobile telephone 305 and to automatically store insurance rating related data.

Once the insurance rating related data, such as data representative of a series of locations and associated day and time associated with each location, is stored in an insurance related database, a processor (e.g., processor 385 of FIG. 3) may determine various characteristics related to an insured individual using the insurance rating related data. For example, the processor 385 may determine a total number of miles an insured person has driven an automobile in any given time period, a geographic area that the insured person travels in, the types of physical activities an insured person participates in, how fast the insured person has driven, etc. The insurance rating related data and the characteristics may be used to determine an insurance risk.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computerized method for automatically collecting and storing personal item data in a mobile computing device when the mobile computing device is proximate a wireless transceiver device, the method comprising:

automatically receiving, at a processor of the mobile computing device, via a wireless communications link of the wireless transceiver device, an indication that the mobile computing device is proximate the wireless transceiver device in response to the processor executing a wireless transceiver device and mobile computing device synchronization module;

automatically receiving, at the processor of the mobile computing device from a tamperproof mechanism of the wireless transceiver device, a tampering indication whether the wireless transceiver device has been tampered with, wherein the processor determines whether the wireless transceiver device has been tampered with in response to the tamperproof mechanism being broken;

automatically receiving, at the processor of the mobile computing device, from the wireless transceiver and via the wireless communications link, data representative of an identification of the wireless transceiver device in response to the processor automatically receiving the indication that the mobile computing device is proximate the wireless transceiver and in further response to the processor executing a data logging module; and causing the processor to automatically receive personal item data via the wireless transceiver device and to store personal item data correlated with the data representative of the identification of the wireless transceiver in a memory coupled to the processor in the mobile computing device in response to automatically receiving the indication that the wireless transceiver device is proximate the mobile computing device and in response to the processor further executing the data logging module when the processor determines that the wireless transceiver device has not been tampered with.

2. The method of claim 1, further comprising:
receiving, at the processor of the mobile computing device, an indication that the mobile computing device is no longer proximate the wireless transceiver device; and
causing the processor to automatically cease storing personal item data in the memory in response to receiving the indication that the mobile computing device is no longer proximate the wireless transceiver device.

3. The method of claim 1, wherein the mobile computing device is a mobile telephone and the wireless transceiver is a Bluetooth device and wherein the Bluetooth device is attached to a personal item.

4. The method of claim 1, further comprising:
receiving at the processor of the computing device an indication of a charge remaining in a battery of the wireless transceiver device.

5. The method of claim 1, wherein the processor stores data representative of a sequence of locations and a sequence of times corresponding to the locations.

6. The method of claim 1, further comprising:
transmitting the data, that is stored in the memory, to a remote server in response to the mobile computing device detecting an availability of a wireless communication network.

7. The method of claim 1, further comprising:
receiving a user input at the processor of the mobile computing device representative of an odometer reading of a vehicle.

8. A system for automatically collecting and storing personal item data in a mobile computing device when the mobile computing device is proximate a wireless transceiver device, the system comprising:
a wireless transceiver device configured to automatically provide, to a mobile computing device and via a wireless communications link of the wireless transceiver device, an indication that the mobile computing device is proximate the wireless transceiver device wherein the wireless transceiver device further comprises a tamperproof mechanism and is configured to receive an indication that the tamperproof mechanism of the wireless transceiver device has been broken and to transmit the indication to a remote server;
a wireless transceiver device and mobile computing device synchronization module stored on a computer-readable medium that, when executed by a processor, causes the processor to automatically receive the indication that the wireless transceiver is proximate the mobile computing device, and causes the processor to automatically receive, via the wireless communications link, data representative of an identification of the wireless transceiver device; and
a data logging module stored on a computer-readable medium that, when executed by a processor, causes the processor to automatically receive personal item data via the wireless transceiver device and to store the personal item data correlated with the data representative of the identification of the wireless transceiver on a memory in response to automatically receiving the indication that the wireless transceiver device is proximate the mobile computing device.

9. The system of claim 8, wherein execution of the wireless transceiver device and mobile computing device synchronization module further comprises:
causing the processor to provide data representative of an identification of a particular personal item.

10. The system of claim 8, further comprising:
an insurance data transmission module stored on a computer-readable medium that, when executed by a processor, causes the processor to transmit the personal item data from a mobile computer device insurance application to a remote server.

11. The system of claim 9, wherein the wireless transceiver device is a Bluetooth device and a mobile computing device insurance application is stored on a computer-readable medium of a mobile telephone, wherein when the mobile computing device insurance application is executed by a processor to provide a user interface to enable a user to associate the mobile telephone with an insured person.

12. The system of claim 11, wherein the processor is within the mobile telephone and the processor stores personal item data, associated with the at least one personal item and correlated with the data representative of a particular insurance policy associated with the at least one personal item, in a memory within the mobile telephone.

13. The system of claim 8, wherein the wireless transceiver device is a radio frequency identification device.

14. The system of claim 8, wherein the wireless transceiver device stores data representative of a sequence of locations and a sequence of times corresponding to the locations.

15. A computer-readable storage medium comprising non-transitory computer-readable instructions stored thereon and to be executed on a processor of a system for automatically collecting and storing personal item data in a mobile computing device when the mobile computing device is proximate a wireless transceiver device, the stored instructions comprising:

a wireless transceiver device and mobile computing device synchronization module that, when executed by a processor, causes the processor to receive, via a wireless communications link of a wireless transceiver device, an indication that a wireless transceiver is proximate a mobile computing device and provide an indication that the wireless transceiver device is proximate with the mobile computing device, and causes the processor to receive, at the mobile computing device and via the wireless communications link, data representative of an identification of the wireless transceiver device;

a tamperproof module that, when executed by a processor, causes the processor to receive, from a tamperproof mechanism of the wireless transceiver device, a tampering indication whether the wireless transceiver device has been tampered with, wherein the processor determines whether the wireless transceiver device has been tampered with in response to the tamperproof mechanism being broken; and a data logging module that, when executed by a processor, causes the processor to automatically receive personal item data, at the mobile computing device and via the wireless transceiver device, and store the personal item data correlated with the data representative of the identification of the wireless transceiver on a memory in response to receiving the indication that the wireless transceiver device is proximate the mobile computing device.

16. The computer-readable storage medium of claim 15, wherein execution of the wireless transceiver device and mobile computing device synchronization module further causes the processor to receive data representative of an identification of a particular vehicle and execution of the data logging module further causes the insurance risk related data to be correlated with a particular insurance policy associated with the particular vehicle.

17. The computer-readable storage medium of claim 15, wherein the instructions further comprise:

a media access control (MAC) address receiving module that, when executed by a processor, causes the processor to receive a media access control (MAC) address from the wireless transceiver device; and a battery life data receiving module that, when executed by a processor, causes the processor to receive data representative of a remaining charge in a battery within the wireless transceiver device.

18. The computer-readable storage medium of claim 15, wherein the instructions further comprise:

a Bluetooth device identification and customization module that, when executed by a processor, causes the processor to associate the wireless transceiver device with a data file, within a mobile computing device, that is associated with a personal item to which the wireless transceiver device is attached.

19. The computer-readable storage medium of claim 15, wherein execution of the insurance data logging module further causes the processor to access a mobile computing device location device and a mobile computing device calendar and clock and to store data representative of a sequence of locations and a day and a time associated with each location.

20. The computer-readable storage medium of claim 19, wherein execution of the data transmission module further causes the processor to transmit the data representative of the sequence of locations and the day and time associated with each location to a remote server.

* * * * *